(12) United States Patent
Kazaz et al.

(10) Patent No.: US 12,461,196 B2
(45) Date of Patent: Nov. 4, 2025

(54) METHOD AND APPARATUS FOR PROCESSING JOINT MULTIPLE CHIRP SEQUENCES

(71) Applicant: NXP B.V., Eindhoven (NL)

(72) Inventors: Tarik Kazaz, Eindhoven (NL); Karan Jayachandra, Rotterdam (NL); Arie Geert Cornelis Koppelaar, Giessen (NL); Yiting Lu, Delft (NL)

(73) Assignee: NXP B.V., Eindhoven (NL)

( * ) Notice: Subject to any disclaimer, the term of this patent is extended or adjusted under 35 U.S.C. 154(b) by 364 days.

(21) Appl. No.: 18/318,792

(22) Filed: May 17, 2023

(65) Prior Publication Data

US 2024/0385286 A1    Nov. 21, 2024

(51) Int. Cl.
*G01S 7/35*      (2006.01)
*G01S 13/58*     (2006.01)

(52) U.S. Cl.
CPC ............ *G01S 7/356* (2021.05); *G01S 13/584* (2013.01)

(58) Field of Classification Search
CPC ........ G01S 7/356; G01S 13/584; G01S 7/354; G01S 13/931; G01S 7/038; G01S 7/0235;
(Continued)

(56) References Cited

U.S. PATENT DOCUMENTS 9,835,723 B2   12/2017   Jansen et al.
10,557,931 B2   2/2020   Schoor et al.
(Continued)

FOREIGN PATENT DOCUMENTS

EP    3015880 B1    5/2020

OTHER PUBLICATIONS

Kazaz, Tarik et al.; "Joint Multiple FMCW Chirp Sequence Processing for Velocity Estimation and Ambiguity Resolving"; 2023 IEEE International Radar Conference (RADAR), Conference Date Nov. 6-10, 2023, Sydney, Australia; DOI: 10.1109/RADAR54928.2023.10371091.

(Continued)

*Primary Examiner* — Vladimir Magloire
*Assistant Examiner* — Naomi M Wolford (57) ABSTRACT

A non-transitory computer-readable medium stores machine instructions that cause a processor to obtain a range-sample-antenna data cube for a received radar signal comprising reflections of a plurality of interleaved chirp sequences. The processor generates, for each chirp sequence, a Hankel matrix based on subset of range bins for the particular chirp sequence, and generates a block Hankel matrix based on the Hankel matrices for the plurality of interleaved chirp sequences. The processor performs truncated singular value decomposition to estimate subspaces, and object detection to identify selection matrices. The processor calculates least-squares approximations for the selection matrices and the block Hankel matrix to obtain, for each chirp sequence, a first phase shift matrix $\theta_{11}$ and a second set of phase shift matrices $\theta_{1l}$, $l=2, \ldots, L$. The processor performs joint diagonalization and Doppler division multiplexing compensation on $\theta_{11}$ and $\theta_{1l}$, $l=2, \ldots, L$, then resolves ambiguities in determined velocities based on comparison of $\theta_{11}$ and $\theta_{1l}$, $l=2, \ldots, L$.

21 Claims, 7 Drawing Sheets

(58) Field of Classification Search
CPC ........ G01S 13/42; G01S 7/0232; G01S 7/352; G01S 13/589; G06F 17/16
See application file for complete search history.

(56) References Cited

U.S. PATENT DOCUMENTS

| | | | |
|---|---|---|---|
| 10,627,483 B2 | 4/2020 | Rao et al. | |
| 11,378,649 B2 | 7/2022 | Rao et al. | |
| 11,525,908 B2* | 12/2022 | Laghezza | G01S 13/583 |
| 2022/0276338 A1 | 9/2022 | Wu et al. | |

OTHER PUBLICATIONS

Van Der Veen, Alle-Jan, "Joint Diagonalization via Subspace Fitting Techniques," 2001 IEEE International Conference on Acoustics, Speech, and Signal Processing. Proceedings, 4 pages.

Bazzi et al., "Detection of the Number of Superimposed Signals Using Modified MDL Criterion: A Random Matrix Approach," 2016 IEEE International Conference on Acoustics, Speech and Signal Processing (ICASSP), 5 pages.

Theis et al., "On the use of joint diagonalization in blind signal processing," 2006 IEEE International Symposium on Circuits and Systems, 4 pages.

Haardt et al., "Unitary ESPRIT: How to Obtain Increased Estimation Accuracy with a Reduced Computational Burden," IEEE Transactions on Signal Processing, vol. 43, No. 5, May 1995, 11 pages.

\* cited by examiner

BLOCK HANKEL MATRIX H_BLOCK 670

FIG. 7

METHOD AND APPARATUS FOR PROCESSING JOINT MULTIPLE CHIRP SEQUENCES

BACKGROUND

Some radar systems are included in vehicles as part of automated driving assistance systems and used to assist in perception of environments around the vehicles. Important parameters for automotive radar systems have maximum unambiguous ranges and maximum unambiguous velocities. The maximum unambiguous range is directly proportional to the pulse repetition interval, while the maximum unambiguous velocity is inversely proportional to the pulse repetition interval, making it difficult to improve both with a single chirp sequence. As a result, multiple chirp sequences are used, and fast Fourier transforms (FFTs) are performed on the individual chirp sequences to determine velocity. However, determining the velocity in this way does not use all available samples and processes the different chirp sequences separately, resulting in incoherency and signal gain loss. That is, the FFTs are applied to each chirp sequence separately, which causes different ambiguities in the resulting velocity determination. The ambiguities arising from each individual velocity determination must be reduced by searching for consistencies in the ambiguous velocities.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

As discussed previously herein, some techniques for determining the velocity of objects in the environment around a radar system incoherently compare the Doppler fast Fourier transforms (FFTs) for different chirp sequences and do not use all available radar data samples. The disclosed techniques and radar systems implementing the disclosed techniques are able to process multiple chirps coherently, such that all the available radar data samples are used. As a result, the disclosed techniques and radar system implementing them are able to more accurately determine the velocity of objects at larger distances than conventional techniques.

Figure 1:
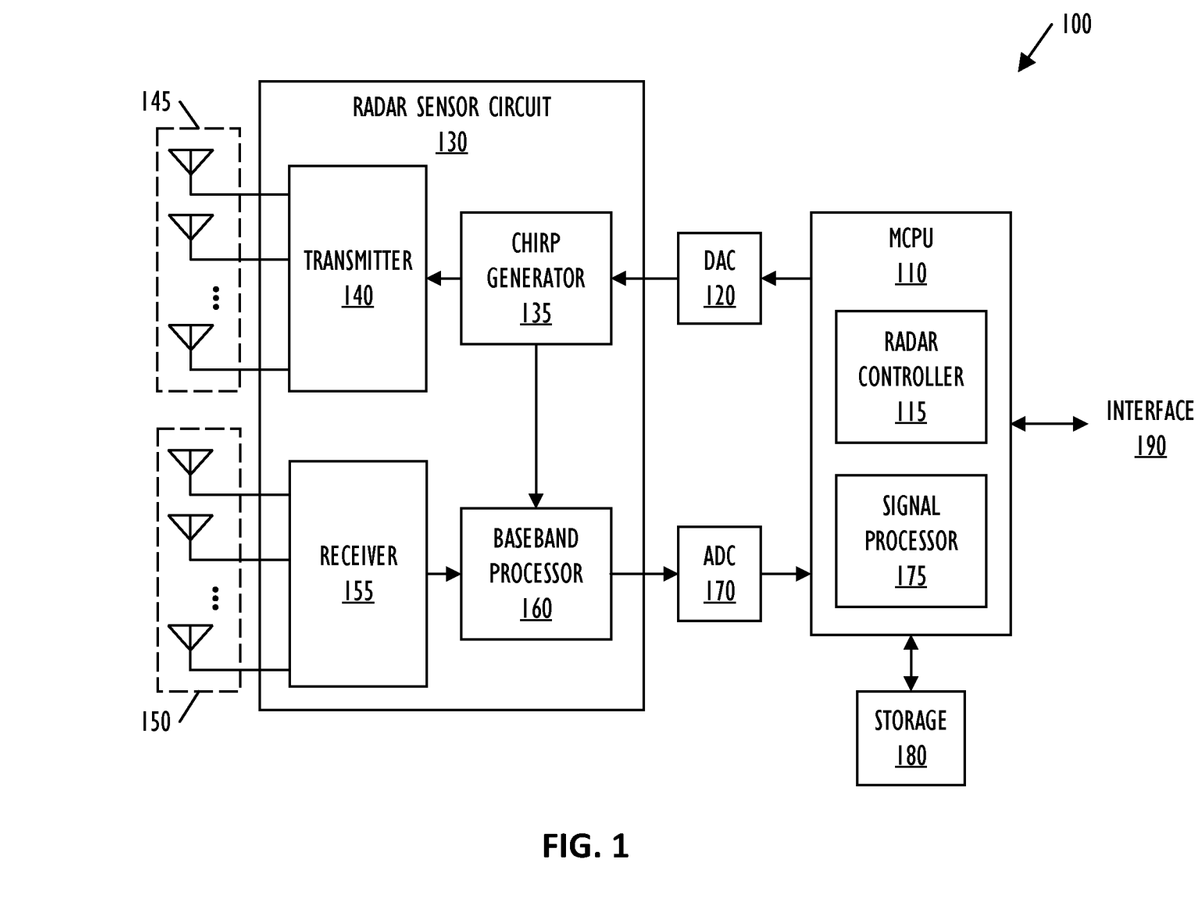
FIG. 1 shows, in block diagram form, an example radar system, according to one embodiment.

FIG. 1 shows, in block diagram form, an example radar system 100, according to an embodiment. Radar system 100 can be included in a vehicle, such as for an automotive driver assistance system. The example radar system 100 is a frequency-modulated continuous wave (FMCW) radar system, also referred to as a continuous-wave frequency-modulated (CWFM) radar, and capable of determining the distance or range, velocity, and angle of arrival of an object in the field of view of radar system 100. The term "angle of arrival" or "direction of arrival" of an object is used herein to indicate the angle of arrival of a signal reflected off the object relative to the alignment of the radar system. Although radar system 100 is described herein as a linear chirp radar system, any appropriate radar system that generates range-Doppler information can be used.

In this example, radar system 100 includes a microcontroller and processor unit (MCPU) 110, a digital-to-analog converter (DAC) 120, a radar sensor circuit 130, a first antenna array 145, a second antenna array 150, an analog-to-digital converter (ADC) 170, and storage 180. The MCPU 110 comprises one or more MCPU cores, general purpose processing cores, array or vector processing cores, parallel processing cores, graphic processing units, neural net and linear algebra accelerators, field-programable gate arrays, digital signal processors, application-specific integrated circuits, and the like, or any combination thereof. The term "MCPU" in the singular is used herein to refer to either a single or multiple of the MCPU cores, general purpose processing cores, array or vector processing cores, parallel processing cores, graphic processing units, digital signal processors, neural net and linear algebra accelerators, application-specific integrated circuits, field-programable gate arrays, and the like, or any combination thereof comprised in the MCPU 110.

MCPU 110 includes a radar controller 115 and a signal processor 175. The radar controller 115 can receive data from the radar sensor circuit 130 and control radar parameters of the radar sensor circuit 130 such as frequency band, length of a radar frame, and the like via the DAC 120. A control signal from DAC 120 can be used to adjust the radar chirp signals output from a chirp generator 135 included in radar sensor circuit 130. The signal processor 175 in MCPU 110 can also receive the data from the radar sensor circuit 130 and perform signal processing for determining a distance or range between a target object and radar system 100, a radial velocity of the target object, an angle of arrival for the target object, and the like. The signal processor 175 can provide the calculated values to the storage 180 and/or to other systems via the interface 190.

The interface 190 can enable the MCPU 110 to communicate with other systems over local and wide area networks, the internet, automotive communication buses, and/or other kinds of wired or wireless communication systems, for example. The MCPU 110 can provide the calculated values over the interface 190 to other systems, such as a radar-camera-lidar fusion system; an automated driving assistance system including parking, braking, or lane-change assistance features; and the like. The storage 180 can be used to store instructions for the MCPU 110, received data from the radar sensor circuit 130, calculated values from the signal processor 175, and the like. Storage 180 can be any appropriate storage medium, such as a volatile or non-volatile memory.

The radar sensor circuit 130 includes the chirp generator 135, a transmitter 140, a receiver 155, and a baseband processor 160. The chirp generator 135 can include a local oscillator, for example, and generates radar chirp signals and provides them to the transmitter 140. For example, the chirp generator 135 frequency can modulate a continuous wave signal to form a series of linear chirp signals. The transmitted chirp signal of a known, stable frequency continuous wave varies up and down in frequency over a fixed period of time by the modulated signal. The chirp generator 135 provides the generated chirp signals to the transmitter 140, which drives the first antenna array 145 of one or more transmitter (TX) antennas. The second antenna array 150 comprises one or more receiver (RX) antennas and receives signals reflected from objects in the path of the transmitted chirp signals from the TX antenna array 145. The TX antenna array 145 and the RX antenna array 150 can be stationary or configured to transmit and receive across a range of area, such as by mechanical movement. Implementations including multiple TX antennas in TX antenna array 145 and multiple RX antennas in RX antenna array 150 are called multiple-input, multiple-output (MIMO) radar systems and correspond to a virtual antenna array.

The receiver 155 receives the reflected signals from the RX antenna array 150 and provides them to the baseband processor 160. The baseband processor 160 also receives the transmitted chirp signals from the chirp generator 135 and down-converts the received chirp signals directly into the baseband using the copy of the transmitted chirp signals from the chirp generator 135. The baseband processor 160 can then filter and amplify the baseband signal. The baseband processor 160 provides the filtered and amplified baseband signal to the ADC 170, which digitizes the signal and provides it to the MCPU 110. The signal processor 175 in the MCPU 110 can then perform time domain to frequency domain transforms such as fast Fourier transforms (FFTs) and other signal processing to determine the distance, radial velocity, and angle of arrival between the target object and the radar system 100.

Frequency differences between the received reflections and the transmitted chirp signal increase with delay and so are proportional to distance. The phase differences between the received reflections across consecutive chirps in a radar frame are indicative of the velocity of objects in the field of view. For implementations in which RX antenna array 150 includes two or more receiver antennas, the phase difference between received reflections at a first RX antenna and received reflections at a second RX antenna can be used to determine the angle of arrival of target objects. For example, the down-converted and digitized receive signal corresponding to each chirp is first transformed using an FFT (called the range FFT). The range FFT produces a series of range bins with the value of each range bin denoting the signal strength of reflected targets at the corresponding range. A further "Doppler" FFT is then performed for each range bin across all the chirps in a frame to estimate the velocities of reflected targets. Additional processing can then be performed to determine the angle of arrival between the targets and the radar system 100. Although the radar system 100 is described herein as implementing FFT-based range-Doppler processing, any appropriate transforms may be used to produce the range-Doppler information.

For an implementation in which the radar system 100 is included in a vehicle with an automated driving assistance system, the automated driving assistance system can use the determined distance, velocity, and angle of arrival for objects in the field of view from the radar system 100 to provide parking, braking, or lane-change assistance. The radar system 100 must determine the velocity of objects with sufficient accuracy and speed to provide the automated driving assistance system with meaningful information such that meaningful driving assistance can be provided. Some existing methods for determining the velocity are computationally expensive, have limited velocity resolution, have limited maximum unambiguous velocity, or some combination thereof.

Figure 2:
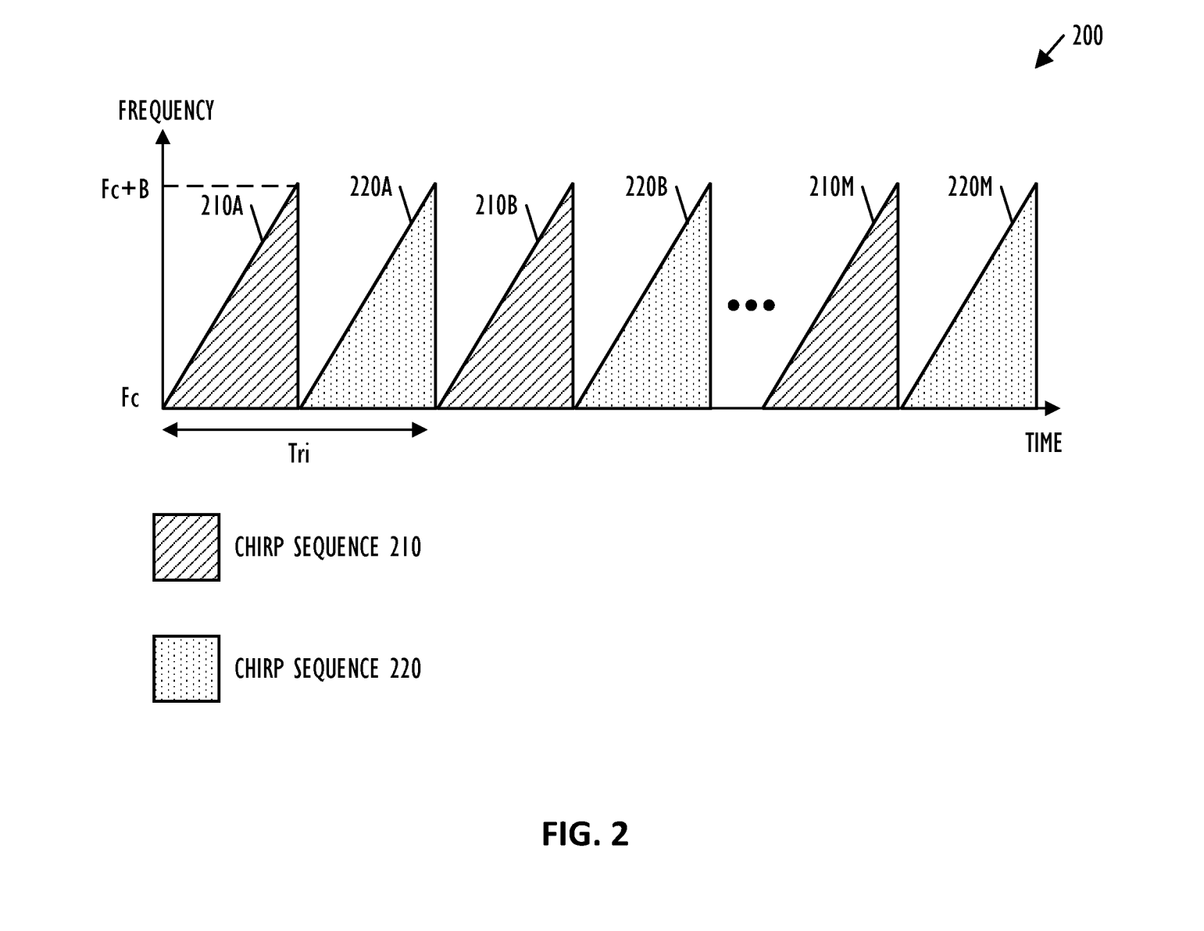
FIG. 2 shows a diagram of two interleaved chirp sequences, according to one embodiment.

FIG. 2 shows a diagram 200 of two interleaved chirp sequences, according to one embodiment. A chirp signal is defined by a carrier frequency $f_c$, a bandwidth B, a settle time $T_{settle}$ during which the chirp generator settles, a chirp acquisition time $T_c$ during which a receiver receives reflections of the transmitted chirp signal off of objects in the environment, and a reset time $T_{res}$ during which the chirp generator resets. To estimate the velocities of objects in the environment, multiple chirp signals are sent at regular repetition intervals $T_{ri}$. The repetition interval $T_{ri}$ includes the settling time $T_{settle}$, the chirp acquisition time $T_c$, the reset time $T_{res}$, and a dwell time $T_{dwell}$ during which the transmitter can be turned off. In the example shown in diagram 200, the chirp 210A in the chirp sequence 210 has a dwell time $T_{dwell}$ during which the chirp 220A from chirp sequence 220 is transmitted. Each of chirp sequence 210 and 220 has a number M of chirps. Although in diagram 200 two chirp sequences 210 and 220 are interleaved, any number L of chirp sequences may be interleaved sequentially.

Figure 3:
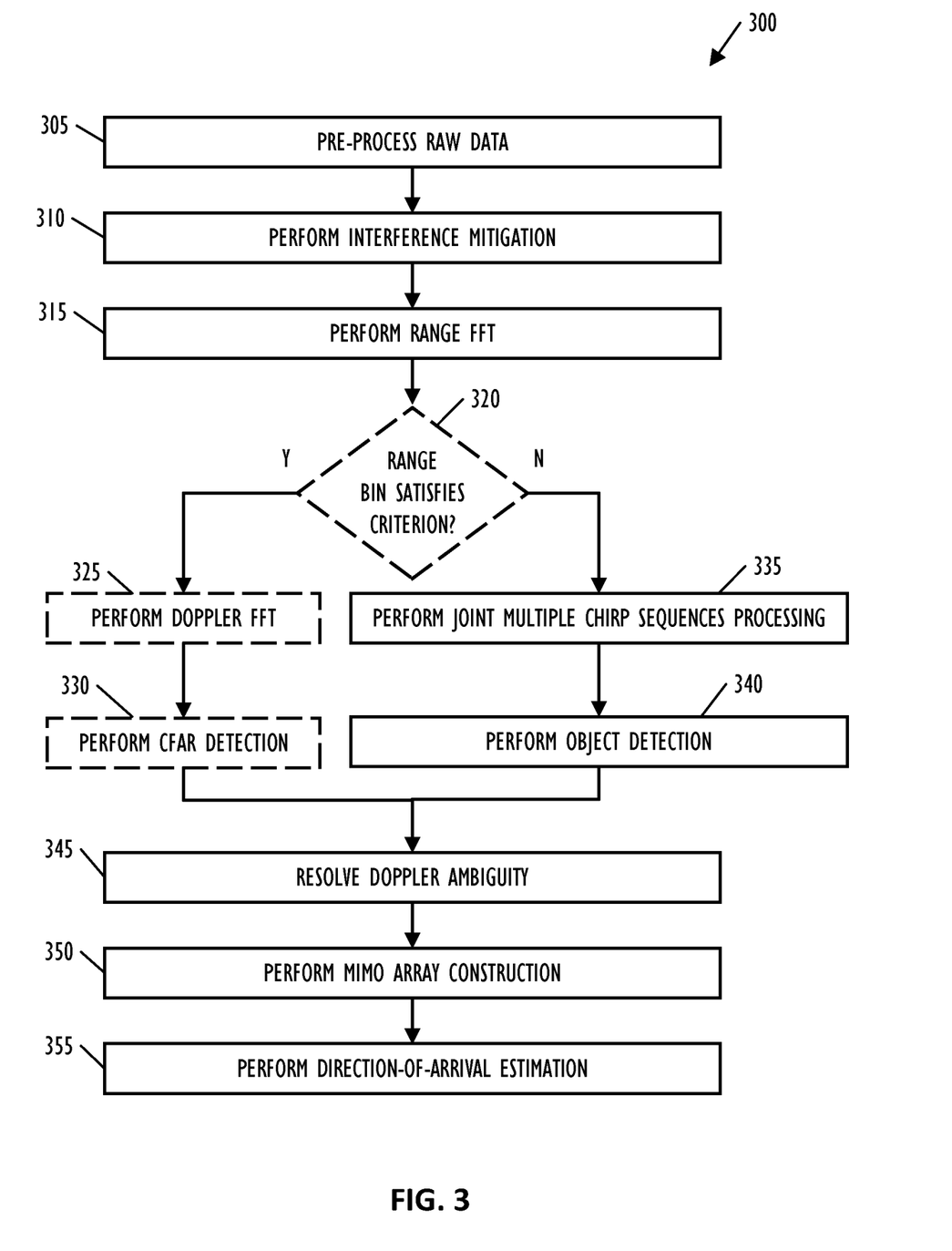
FIG. 3 shows, in flow chart form, an example process for analyzing received radar signals, according to one embodiment.

FIG. 3 shows, in flow chart form, an example process 300 for analyzing received radar signals, according to one embodiment. For ease of illustration, the process 300 is described herein with reference to the radar system shown in FIG. 1 and the diagram 200 shown in FIG. 2. The process 300 is described herein as being performed by the signal processor 175 in the MCPU 110 executing instructions stored in storage 180 of the radar system 100, but can be performed by any appropriate processing unit executing instructions stored in any appropriate non-transitory computer-readable medium. The steps of process 300 are shown in a particular order in FIG. 3, but the steps of process 300 may be performed in a different order and/or some steps may be performed simultaneously. One or more steps of process 300 can be optional, and process 300 can include additional steps.

The process 300 begins at step 305, at which the signal processor 175 pre-processes the received radar data, for example by amplifying the received radar signal, mixing the received radar signal with the transmitted radar signal, and the like. At step 310, the signal processor 175 performs interference mitigation to reduce the impact of interfering radar signals in the pre-processed radar data. For example, the signal processor 175 can filter the pre-processed radar data at a known frequency of an interfering signal. At step 315, the signal processor 175 performs a range FFT to obtain a range-sample-antenna data cube that indicates a signal strength for the received radar data from each antenna at each range bin.

At optional step 320, the signal processor 175 determines whether a characteristic of each range bin in the range-sample-antenna data cube satisfies a criterion. For example, the criterion can represent a threshold signal-to-noise ratio (SNR) or a particular subset of range bins, such as the farthest ten range bins of the range-sample-antenna data cube, and the like. In response to the characteristic of the range bin satisfying the criterion, the signal processor 175 performs a Doppler FFT on sequential interleaved chirps to obtain range-Doppler-antenna data cubes that indicate a signal strength for the received radar data at each range bin and velocity bin.

For example with respect to diagram 200 shown in FIG. 2, the signal processor 175 performs a first Doppler FFT on chirps 210A, 210B, . . . , 210M from chirp sequence 210 and a second Doppler FFT on chirps 220A, 220B, . . . , 220M from chirp sequence 220 to obtain two range-Doppler-antenna data cubes corresponding to the chirp sequences 210 and 220, respectively. The diagram 200 shows two interleaved chirp sequences 210 and 220, but in other implementations, any appropriate number L of chirp sequences can be interleaved, such that the signal processor 175 performs L Doppler FFTs to obtain L range-Doppler-antenna data cubes corresponding to the L chirp sequences. The Doppler FFTs are performed on sequential chirps to determine the velocity of objects in the environment. The determined velocities are ambiguous due to Doppler ambiguity and $2\pi$ wrapping, which is resolved at step 345. At optional step 330, the signal processor 175 performs constant false alarm rate (CFAR) detection to further reduce the impact of noise and clutter in the received radar data and identify objects in the environment and the corresponding range and velocity bins.

In response to the range bin not satisfying the criterion at optional step 320, the signal processor 175 performs joint multiple chirp sequences processing at step 335. For example, the SNR for the range bin is less than the threshold SNR, or the index of the range bin is within the particular subset of range bins. Joint multiple chirp sequences processing is performed on the number L of sequential interleaved chirps at once, rather than on each chirp individually, and is described further herein with respect to FIG. 4. At step 340, the signal processor 175 performs object detection on the results of the joint multiple chirp sequences processing to identify objects in the environment and the corresponding range and velocity bins. In implementations without the optional step 320, the signal processor 175 proceeds directly to step 335 from step 315.

In some implementations, the optional steps 320, 325, and 330 can be included to reduce the computational complexity. For example, the joint multiple chirp sequences processing performed at step 335 can offer improved maximum unambiguous velocity and velocity resolution compared to the Doppler FFT performed at step 325 but at the cost of increased computational complexity and increased processing time. To balance the computational cost and the improvements to maximum unambiguous velocity and velocity resolution, the signal processor 175 can perform the conventional steps 325 and 330 for range bins having higher SNRs or range bins nearer to the radar system, and perform the joint multiple chirp sequences processing at steps 335 and 340 for range bins having lower SNRs or range bins farther from the radar system.

At step 345, the signal processor 175 resolves Doppler ambiguities in the determined velocities. For example, the signal processor 175 can compare the determined velocities for the chirp sequence 210 and the determined velocities for the chirp sequence 220 by using integer ambiguity resolving based on $2\pi$ integer unfolding of two ambiguous estimates and a minimum difference search between unfolded estimates. At step 335, two ambiguous estimates for chirp sequences 210 and 220 are estimated jointly and directly from both of these sequences together. For the velocities determined using the FFT approach at step 325, phase interferometry between the chirp sequences 210 and 220 can be applied to resolve $2\pi$ wrapping of the phase differences between chirps. At step 350, the signal processor 175 performs MIMO array construction to create the virtual array corresponding to the TX and RX antennas. At step 355, the signal processor 175 estimates target directions of arrival for objects.

Figure 4:
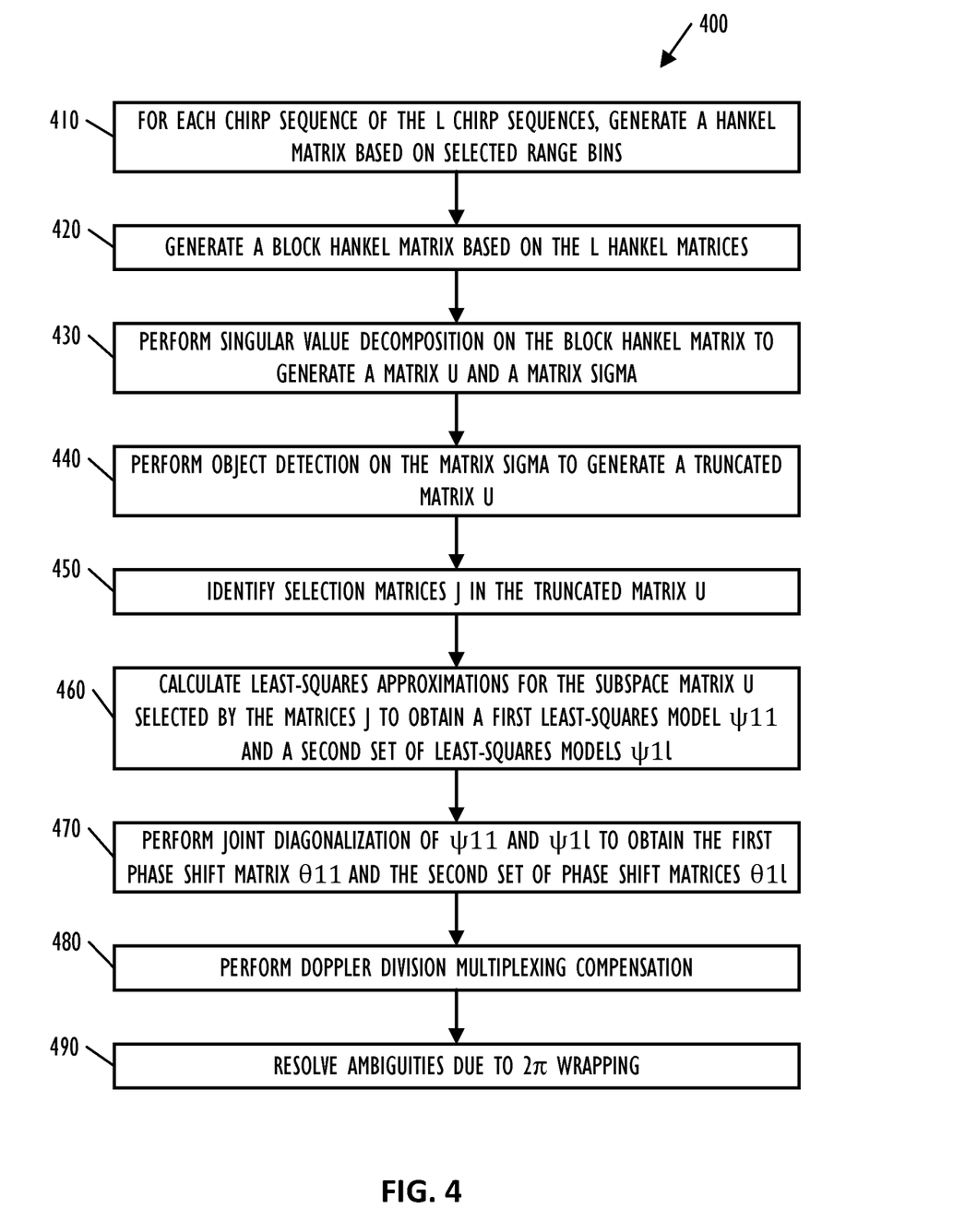
FIG. 4 shows, in flow chart form, an example process for joint multiple chirp sequences processing, according to one embodiment.

FIG. 4 shows, in flow chart form, an example process 400 for joint multiple chirp sequences processing, according to one embodiment. For ease of illustration, the process 400 is described herein with reference to the radar system shown in FIG. 1 and the diagrams 200, 500, 600, and 700 shown in FIGS. 2 and 5-7, respectively. The process 400 is described herein as being performed by the signal processor 175 in the MCPU 110 executing instructions stored in storage 180 of the radar system 100, but can be performed by any appropriate processing unit executing instructions stored in any appropriate non-transitory computer-readable medium. The steps of process 400 are shown in a particular order in FIG. 4, but the steps of process 400 may be performed in a different order and/or some steps may be performed simultaneously. One or more steps of process 400 can be optional, and process 400 can include additional steps.

The process 400 begins at step 410, at which the signal processor 175 generates a Hankel matrix for each chirp sequence of the number L of chirp sequences based on the corresponding selecting range bins. For example in diagram 500 shown in FIG. 5, the input beat signal samples 510 for chirp sequence 210 shown in diagram 200 in FIG. 2 are indexed by chirp 210A-M and by sample within each chirp. After steps 305-315 of process 300 shown in FIG. 3—the data pre-processing, interference mitigation and range FFT—the resulting range spectrum 530 for chirp sequence 210 is indexed by chirp 210A-M and by range bin. The unfilled boxes indicate chirp and range bins at which the signal strength is below a threshold; that is, the unfilled boxes indicate chirp and range bins that are empty, where there is not an object in the environment.

Figure 5:
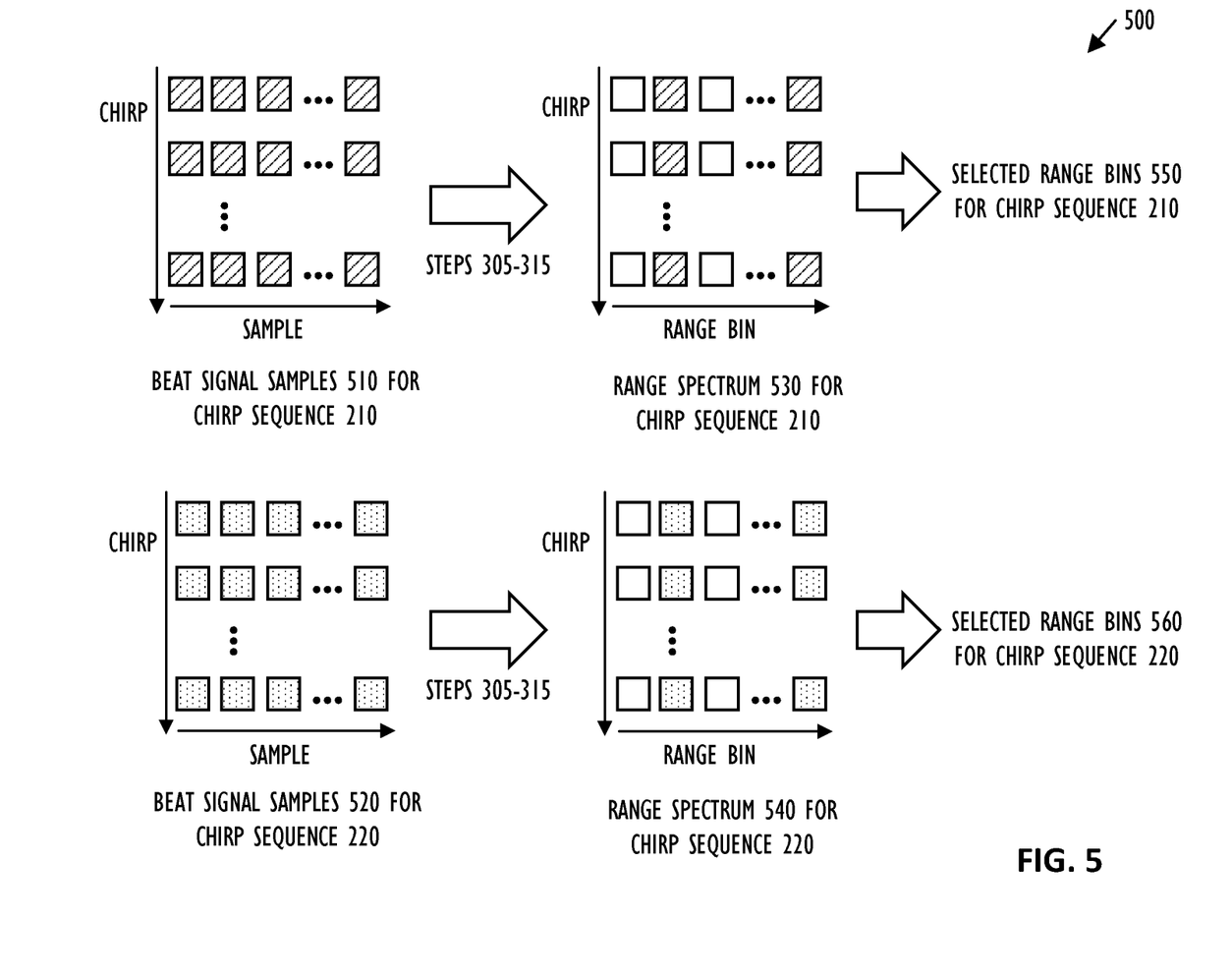
FIG. 5 shows a diagram of data samples at different stages of the process shown in FIG. 2, according to one embodiment.

The input beat signal samples 520 for chirp sequence 220 shown in diagram 200 in FIG. 2 are indexed by chirp 220A-M and by sample within each chirp. After steps 305-315 of process 300, the resulting range spectrum 540 for chirp sequence 220 is indexed by chirp 220A-M and by range bin. In diagram 500, the unfilled boxes are the same between the range spectrum 530 for chirp sequence 210 and the range spectrum 540 for chirp sequence 220, but in other implementations, the unfilled boxes are different between the two range bins. Returning to the process 500, the signal processor 175 selects a subset of the range spectrum 530 for the selected range bins 550, which are used to construct the Hankel matrix for the chirp sequence 210 at step 410. Similarly, the signal processor 175 selects a subset of the range spectrum 540 for the selected range bins 560, which are used to construct the Hankel matrix for the chirp sequence 220 at step 410.

The selected range bins 550 and 560 can be chosen based on the signal strength in each range bin, the expected number of objects at each range bin, and the like. The same range bin indexes are included in each of the Hankel matrices for the L chirp sequences. The dimensions of each Hankel matrix are B×Q, where the number B is greater than a maximum expected number P of objects in a range bin and the number Q is greater than or equal to the maximum expected number P of objects in a range bin. In some implementations, the number B is equal to the number M of chirps in a chirp sequence minus the number Q minus one. The numbers B and Q can be tailored to each particular implementation.

Each Hankel matrix $H_l$ can be represented as:

$$H_l = M'\theta_{1l}X + N_l \quad (1)$$

where M' is an B×(PK) sub-matrix of a Vandermonde matrix M, K is the number of transmitters, $\theta_{1l}$ is a diagonal matrix that represents phase shifts introduced by velocities of the objects in the environment between the first chirp sequence and the lth chirp sequence, X is a matrix representing shifted combination of complex amplitudes of the received radar signal reflected off of objects in the environment with object velocity induced phase changes, and $N_l$ is a noise matrix for the lth chirp sequence. The matrix $M \in C^{M \times PK}$ is a Vandermonde matrix that satisfies the model $M=[M_1 \, M_2 \, \ldots \, M_K]$, where each matrix $M_k$ for $k=1, \ldots, K$ are also Vandermonde matrices represented as:

$$M_k = \begin{bmatrix} 1 & 1 & \cdots & 1 \\ \Phi_{k,1} & \Phi_{k,2} & \cdots & \Phi_{k,P} \\ \vdots & \vdots & \ddots & \vdots \\ \Phi_{k,1}^{M-1} & \Phi_{k,2}^{M-1} & \cdots & \Phi_{k,P}^{M-1} \end{bmatrix}$$

where $\phi_{k,p} = e^{-j\Phi_{k,p}}$, $\phi_{k,p}$ represents a phase shift introduced by the Doppler division multiplexing frequency $f_k$ of the kth transmitter and the Doppler frequency (i.e., velocity) of the pth object in the environment over the repetition interval between two consecutive chirps in the same chirp sequence and is equal to $2\pi(f_{d,p}+f_k)T_{ri}$. Here, $f_{d,p}$ represents the Doppler frequency of the pth object in the environment and $f_k$ represents the Doppler division multiplexing frequency of the kth transmitter.

The matrix X can be represented as:

$$X = [x, \Phi x, \Phi^2 x, \ldots, \Phi^{Q-1} x] \quad (2)$$

where x is a vector representing the complex amplitudes of the received radar signal, and $\phi$ is a diagonal matrix $[\phi_{1,1}, \ldots, \phi_{K,P}]$ that represents a phase shift introduced by a Doppler division multiplexing frequency of each transmitter and the Doppler frequency of each object in the environment over the repetition interval $T_{ri}$ between two consecutive chirps in the same chirp sequence, such as between chirp 210A and chirp 210B in chirp sequence 210.

At step 420, the signal processor 175 generates a block Hankel matrix $H_{BLOCK}$ based on the L Hankel matrices $H_l$ determined at step 410. For example in diagram 600 shown in FIG. 6, a selected range bin 610 for a chirp sequence A is used to construct a first Hankel matrix $H_A$ 640, the same selected range bin 620 for a chirp sequence B is used to construct a second Hankel matrix $H_B$ 650, and so on, through the same selected range bin 630 for a chirp sequence L which is used to construct an Lth Hankel matrix $H_L$ 660. The Hankel matrices $H_A$ 640, $H_B$ 650, and so on through the Lth Hankel matrix $H_L$ 660 are used to create a block Hankel matrix $H_{BLOCK}$ 670 at step 420. The block Hankel matrix $H_{BLOCK}$ 670 has dimensions of (B*L)×Q. The block Hankel matrix $H_{BLOCK}$ can be represented as:

$$H_{BLOCK} = \begin{bmatrix} H_1 \\ H_2 \\ \vdots \\ H_L \end{bmatrix} := \begin{bmatrix} M' \\ M'\theta_{12} \\ \vdots \\ M'\theta_{1L} \end{bmatrix} X + N \quad (3)$$

Steps 410 and 420 describe the Hankel matrix and block Hankel matrix construction for a single selected range bin and are repeated for each range bin of interest, such as each range bin having lower SNRs or range bins farther from the radar system.

At step 430, the signal processor 175 performs truncated singular value decomposition on the block Hankel matrix $H_{BLOCK}$ to generate a matrix U and a matrix sigma. The matrix U has a size (BL)×Q and preserves the shift invariance properties of the column space of the block Hankel matrix $H_{BLOCK}$. The matrix sigma is a Q×Q diagonal matrix containing Q singular values. The size of the values in the matrix sigma indicate whether the corresponding column vector in the matrix U is a base vector for the signal space or a base vector for the noise subspace.

At step 440, the signal processor 175 performs object detection on the matrix sigma to generate a truncated matrix U. That is, the signal processor 175 performs object detection to determine which of the Q singular values in the matrix sigma and the corresponding column vectors in the matrix U belong to the signal space, rather than the noise subspace. A truncated matrix U can be generated using the column vectors of the larger matrix U that are related to singular values of signals. Any appropriate object detection technique can be used, such as Akaike information criterion object detection or minimum description length object detection. For a Doppler-division multiplexing radar system with a number K of transmitters, a number P of objects in the environment are detected as KP targets, since each target is detected based on each transmitter's chirp signal. Thus, the truncated matrix U has a size (BL)×(KP).

Figure 6:
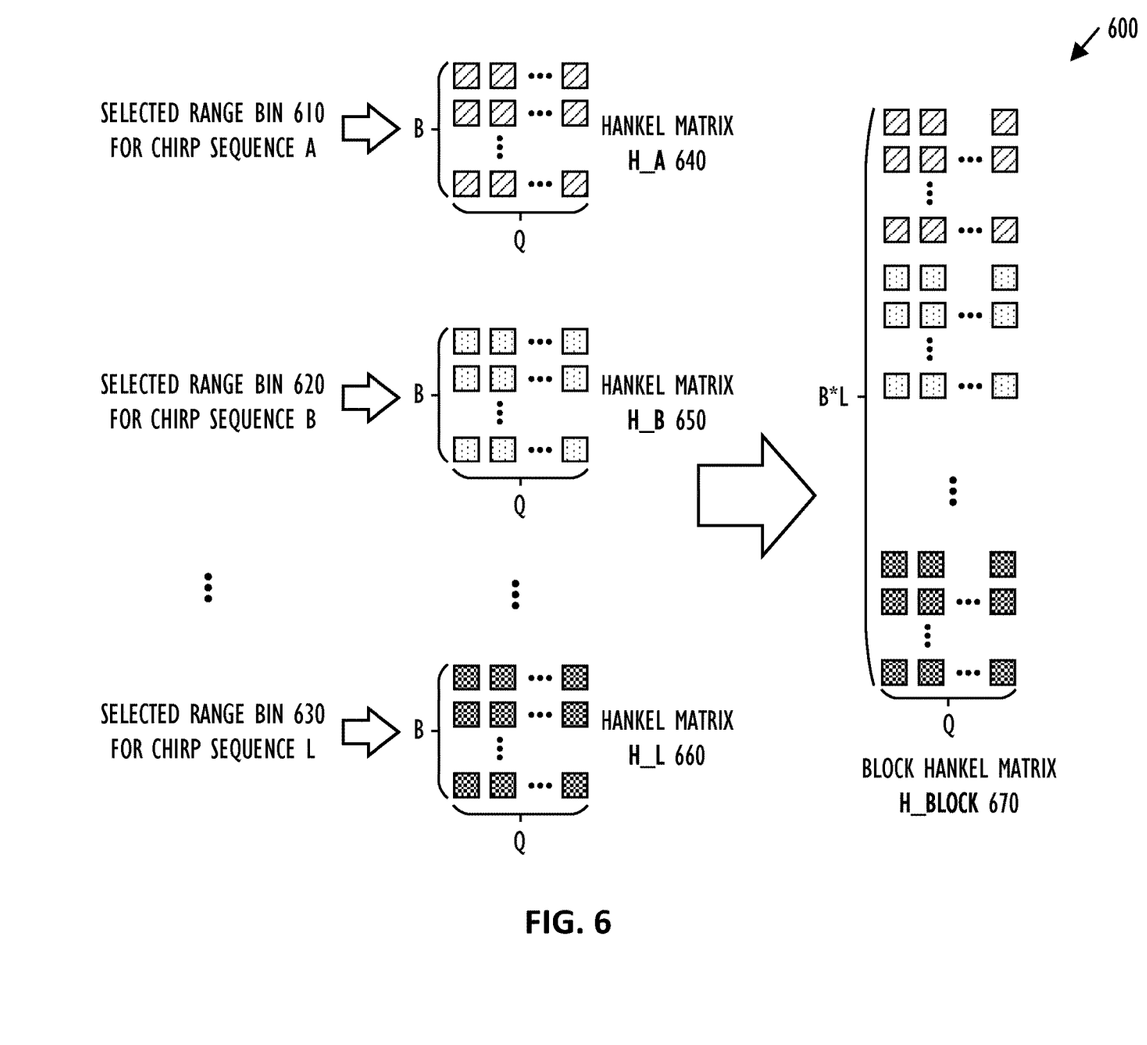
FIG. 6 shows a diagram of data samples at different stages of the process shown in FIG. 4, according to one embodiment.
Figure 7:
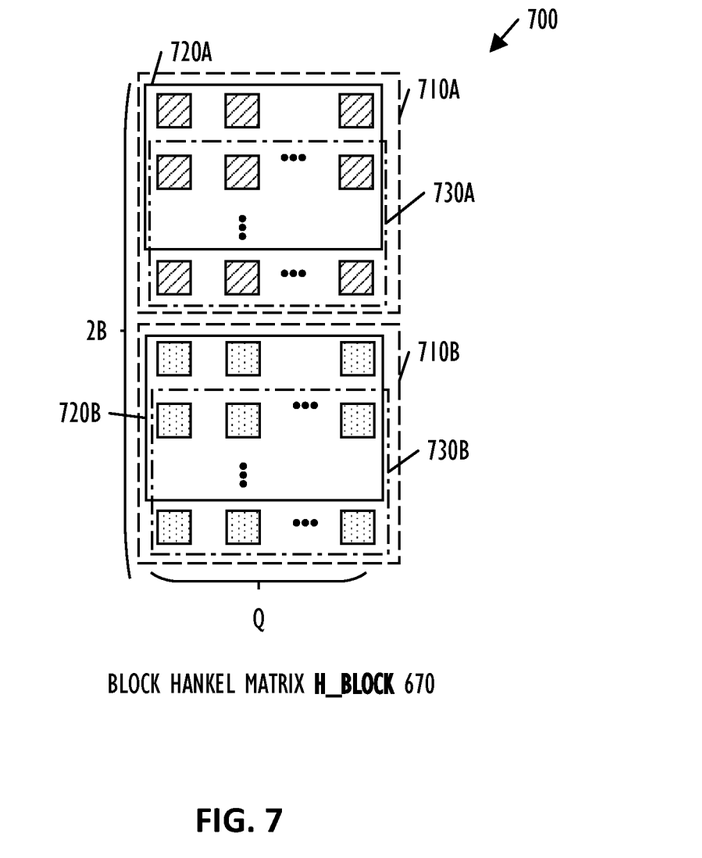
FIG. 7 shows a diagram of selection matrices identified in the process shown in FIG. 4, according to one embodiment.

At step 460, the signal processor 175 identifies selection matrices J in the truncated matrix U. The selection matrices J represent two types of phase shifts introduced by velocities of objects in the environment: a first phase shift φ over the repetition interval $T_{ri}$ between chirps in the same chirp sequence and a second phase shift e between chirps of the same index in different chirp sequences, such as chirp 210A in chirp sequence 210 and chirp 220A in chirp sequence 220. The selection matrices J for the estimated subspace as indicated by the truncated matrix U are illustrated in the diagram 700 shown in FIG. 7. In this example, the number L of chirp sequences is equal to two. The first selection matrix $J_{\theta,l}$ 710B selects the second set of chirps that are phase shifted by $\theta_l$ compared to chirps of the same index selected by the selection matrix $J_{\theta,1}$ 710A. For the case of two chirp sequences 220A and 220B, we denote $J_{\theta,l}$ as $J_{\theta,B}$ and $J_{\theta,1}$ as $J_{\theta,A}$. The second selection matrices $J_{\phi 1}$ 720A-B represent the first reference phase shift $\phi_1$ of the first selected set of chirps in the same chirp sequence, and the third selection matrices $J_{\phi 2}$ 730A-B represent the second phase shift $\phi_2$ of the second set of selected chirps in the same chirp sequence. Here, the phase difference between the second and first phase shifts is denoted as $\theta_{11}$, and it is defined as $\phi_2 * \odot \phi_1$, where operator ( )* represents the complex conjugate of a matrix and the operator $\odot$ denotes the point-wise Hadamard product of two matrices. For a number L of chirp sequences greater than two, the process of selecting the matrices J is repeated for every Hankel matrix in the block Hankel matrix $H_{BLOCK}$ 670. For L interleaved chirp sequences with the same chirp repetition interval and the same number of chirps, a number two times G possible selection matrix pairs can be defined, where G is represented as:

$$G = \frac{L!}{2!(L-2)!} \quad (4)$$

where "!" indicates the factorial of a number.

At step 460, the signal processor 175 calculates least-squares approximations for the subspace matrix U selected by the selection matrices $J_{\Phi 1}$, $J_{\Phi 2}$, $J_{\theta,1}$, and $J_{\theta,2}$ to obtain a first least-squares model $\Psi_{11}$ for the first phase shift matrix $\theta_{11}$ that encode phase shifts within the chirp sequence and a second set of least-squares models $\Psi_{1l}$ for $l=2, \ldots, L$ for the second set of phase shift matrices $\theta_{1l}$, $l=2, \ldots, L$ that encode phase shifts between chirp sequences $\theta_{1l}$, $l=2, \ldots, L$. The least-squares approximation for a particular chirp sequence l in the L chirp sequences can be represented as:

$$\Psi_{11} = U_{\Phi 1}^{\dagger} U_{\Phi 2} = T\theta_{11}T^{-1} \quad (5)$$

$$\Psi_{1l} = U_{\theta 1}^{\dagger} U_{\theta l} = T\theta_{1l}T^{-1}, l = 2, \ldots, L \quad (6)$$

where $\Psi_{11}$ represents a least-squares model for the first phase shift matrix $\theta_{11}$, $\Psi_{1l}$ represent a least-squares models for the second set of matrices $\theta_{1l}$, $l=2, \ldots, L$, and T is a non-singular matrix that jointly diagonalizes $\Psi_{11}$ and $\Psi_{1l}$, wherein the matrix T has dimensions (PK)×(PK) where P is an expected maximum number of objects in a range bin and K is a number of transmitters that transmitted the plurality of interleaved chirp sequences. The $(\ )^{\dagger}$ represents pseudo inverse of a matrix.

At step 470, the signal processor 175 performs joint diagonalization of the L sets of $\Psi_{11}$ and $\Psi_{1l}$ to obtain the first phase shift matrix $\theta_{11}$ and the second set of phase shift matrices $\theta_{1l}$, $l=2, \ldots, L$. For example, the signal processor 175 determines the matrix T that jointly diagonalizes $\Psi_{11}$ and $\Psi_{1l}$ using the optimization:

$$\hat{T}, \hat{W} = \underset{T, W}{\operatorname{argmin}} \left\| \Psi - \left((T^{-1})^T \circ T\right) W \right\|_F^2 \quad (7)$$

which follows from the identity:

$$\sum_{l=1}^{L} \left\| \Psi_{1l} - T\theta_{1l}T^{-1} \right\|_F^2 = \quad (8)$$

$$\sum_{l=1}^{L} \left\| \psi_{1l} - \left((T^{-1})^T \circ T\right) w_{1l} \right\|_F^2 = \left\| \Psi - \left((T^{-1})^T \circ T\right) W \right\|_F^2$$

where $\psi_{1l}$ is equal to vec($\Psi_{1l}$), $w_{1l}$ is equal to diag($\theta_{1l}$), $\Psi$ is equal to $[\psi_{11}, \ldots, \psi_{1L}]$, and W is equal to $[w_{11}, \ldots, w_{1L}]$. The operator "vec" is a vectorization operator that stacks columns of a matrix into a vector; $(*)^T$ is a transpose operator for a matrix; and $\|*\|_F^2$ is a squared Frobenius norm operator for a matrix. In some implementations, the signal processor 175 uses Gauss-Newton iterations to solve the optimization for the matrix T. Once the matrix T is determined, the signal processor 175 can determine the matrices $\theta_{1l}$, $l=1, \ldots, L$ from equations 5 and 6, shown above. For implementations in which the number L of chirp sequences is two, the signal processor 175 can perform joint diagonalization to determine matrix T using QZ iterations or by using unitary matrices and real processing.

At step 480, the signal processor 175 performs Doppler division multiplexing (DDM) compensation in the phase shift estimates obtained from the first phase shift matrix $\theta_{11}$ and the phase shift estimates obtained from the second set of phase shift matrices $\theta_{1l}$, $l=2, \ldots, L$. For each object p in the number P of objects in the environment, K phase shifts are estimated due to the DDM. These K phase estimates can be combined to the single phase estimate $\theta_{11,p}$ as:

$$\theta_{11,p} = \theta_{11,p}^{(1)} + \theta_{11,p}^{(2)} e^{-j\frac{2\pi}{K}} + \ldots + \theta_{11,p}^{(K)} e^{-j\frac{2\pi(K-1)}{K}}, p = 1, \ldots, P \quad (9)$$

The argument of $\theta_{11,p}$ is used to compute the phase from the complex exponential (phasor) $\theta_{11,p}$. Therefore the computed phase shift from $\theta_{11,p}$ is represented as arg($\theta_{11,p}$). In equation (9), $\theta_{11,p}^{(k)}$ represents the phase shift estimate obtained for a pth object in the environment and a kth DDM interval from phase shift matrix $\theta_{11}$. Similarly, the Doppler division multiplexing introduced replicas of phase shift estimates obtained from the set of phase shift matrices $\theta_{1l}$, $l=2, \ldots, L$ can be combined, such that the $\theta_{1l,p}$ can be represented as:

$$\theta_{1l,p} = \theta_{1l,p}^{(1)} + \theta_{1l,p}^{(2)} + \ldots + \theta_{1l,p}^{(K)}, p = 1, \ldots, P \quad (10)$$

Here, $\theta_{1l,p}^{(k)}$ is the phase shift estimate obtained for a pth object in the environment and a kth DDM interval from phase shift matrix $\theta_{1l}$. The argument of the complex exponential $\theta_{1l,p}$ can be used to compute the phase, such that the computed phase shift $\theta_{1l,p}$ is represented as arg($\theta_{1l,p}$). Since all replicas of the phase estimates are combined, the velocities of the objects in the environment can be determined from the first phase shift arg($\theta_{11,p}$) and the second set of the phase shifts arg($\theta_{1l,p}$), $l=2, \ldots, L$.

At step 490, the signal processor 175 resolves ambiguities in the determined velocity for each object in the environment due to $2\pi$ wrapping. The difference in time apertures between the first phase shift arg($\theta_{11,p}$), over the repetition interval Tri between chirps in the same chirp sequence, and the second set of phase shifts arg($\theta_{1l,p}$), $l=2, \ldots, L$, between chirps of the same index in different chirp sequences, allows the determined velocity from the first phase shift $\theta_{11,p}$ and the determined velocities from the second set of phase shifts arg($\theta_{1l,p}$), $l=2, \ldots, L$ to be compared, using integer unfolding and resolving the ambiguity as described in step 345 of the process 300 shown in FIG. 3.

As described herein, the disclosed techniques enable velocity estimation of objects in the environment and integer ambiguity resolving by joint coherent processing of multiple chirp sequences at once. In addition, the disclosed techniques allow the velocity estimates introduced due to Doppler division multiplexing to be combined efficiently, which increases processing gain and improves the root mean square error of the determined velocities compared to conventional FFT-based techniques for determining velocity. The reduced error increases the velocity resolution of radar systems implementing the disclosed techniques, which enables the radar systems to distinguish between objects in the environment that have similar radial velocities. The coherent combining of all available samples improves the dynamic range of the velocity determinations compared to conventional FFT-based techniques. Further the disclosed techniques can be used with any appropriate chirp parameters, and do not constrain the chirp frame design.

Features specifically shown or described with respect to one embodiment set forth herein may be implemented in other embodiments set forth herein.

In this description, the term "couple" may cover connections, communications, or signal paths that enable a functional relationship consistent with this description, including intermediate or intervening components that do not alter the functional relationship. A device that is "configured to" perform a task or function may be configured by programming or hardwiring, for example, at a time of manufacturing by a manufacturer and/or may be configurable or reconfigurable by a user after manufacturing. The configuring may be done through firmware and/or software, construction and/or layout of hardware components and connections, or any combination thereof. As used herein, "node", "pin", and "lead" are used interchangeably. A circuit or device described herein as including certain components may be adapted to be coupled to those components instead, to form the described circuitry or device.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

A system includes at least one processor and at least one non-transitory computer-readable medium storing machine instructions. The machine instructions cause the at least one processor to obtain a range-sample-antenna data cube for a received radar signal comprising reflections of a plurality of interleaved chirp sequences off of objects in an environment. The at least one processor generates, for each chirp sequence of the plurality of interleaved chirp sequences, a Hankel matrix based on a subset of range bins of the range-sample-antenna data cube corresponding to the particular chirp sequence, and a block Hankel matrix based on the Hankel matrices corresponding to the plurality of interleaved chirp sequences. The at least one processor performs truncated singular value decomposition on the block Hankel matrix to estimate subspaces and object detection to identify selection matrices in the estimated subspaces.

The at least one processor then calculates least-squares approximations for the selection matrices and the block Hankel matrix to obtain, for each chirp sequence in the plurality of interleaved chirp sequences, a first phase shift matrix $\theta_{11}$ and a second set of phase shift matrices $\theta_{1l}$, l=2, . . . , L. The first phase shift matrix $\theta_{11}$ represents a phase shift over a repetition interval between chirps in a same chirp sequence, and the second phase shift matrices $\theta_{1l}$, l=2, . . . , L represent a phase shift between chirps of a same sequence index in the plurality of interleaved chirp sequences. The at least one processor performs joint diagonalization of the first matrix $\theta_{1,1}$ and the second set of matrices $\theta_{1l}$, l=2, . . . , L and Doppler division multiplexing compensation on the first matrix $\theta_{11}$ and the second set of matrices $\theta_{1l}$, l=2, . . . , L. The at least one processor then resolves ambiguities in determined velocities based on a comparison of the first matrix $\theta_{11}$ and the second set of matrices $\theta_{1l}$, l=2, . . . , L.

In some implementations, a Hankel matrix corresponding to an lth chirp sequence is represented as:

$$H_l = M'\theta_{1l}X + N_l \qquad (1)$$

where M' is an B×(PK) sub-matrix of a Vandermonde matrix M, B is a number greater than a maximum expected number P of objects in a range bin, K is the number of transmitters, $\theta_{1l}$ is a diagonal matrix that represents phase shifts introduced by velocities of the objects in the environment between the first chirp sequence and the lth chirp sequence, X is a matrix representing shifted combination of complex amplitudes of the received radar signal reflected off of objects in the environment with object velocity induced phase changes, and $N_l$ is a noise matrix for the lth chirp sequence.

In some implementations, a number of possible selection matrix pairs is represented as two time a number G, where G is represented as:

$$G = \frac{L!}{2!(L-2)!}$$

where "!" indicates the factorial of a number. In some implementations, the plurality of interleaved chirp sequences includes a number L of interleaved chirp sequences. The least-squares approximation for an lth chirp sequence is represented as:

$$\Psi_{11} = U_{\Phi 1}^\dagger U_{\Phi 2} = T\theta_{11}T^{-1}$$
$$\Psi_{1l} = U_{\theta 1}^\dagger U_{\theta l} = T\theta_{1l}T^{-1}, l = 2, \ldots, L$$

where $\Psi_{11}$ represents a least-squares model for the first matrix $\theta_{11}$, $\Psi_{1l}$ represents a least-squares model for the second set of matrices $\theta_{1l}$, l=2, . . . , L, and T is a non-singular matrix that jointly diagonalizes $\Psi_{11}$ and $\Psi_{1l}$. The matrix T has dimensions (PK)×(PK), where P is an expected maximum number of objects in a range bin and K is a number of transmitters that transmitted the plurality of interleaved chirp sequences.

In some implementations, the Doppler division multiplexing compensation for the first matrix $\theta_{11}$ causes a phase shift $\arg(\theta_{11,p})$ for a particular object p in a number P of objects in the environment over the repetition interval between chirps in the same chirp sequence to be represented as:

$$\theta_{11,p} = \theta_{11,p}^{(1)} + \theta_{11,p}^{(2)} e^{-j\frac{2\pi}{K}} + \ldots + \theta_{11,p}^{(K)} e^{-j\frac{2\pi(K-1)}{K}}$$

where K is a number of transmitters that transmitted the plurality of interleaved chirp sequences. In some implementations, the Doppler division multiplexing for the second phase shift matrices $\theta_{1l}$, l=2, . . . , L causes a second set of phase shifts $\arg(\theta_{1l,p})$ for a particular object p in a number P of objects in the environment phase shift between chirps of the same index in the plurality of interleaved chirp sequences to be represented as:

$$\theta_{1l,p} = \theta_{1l,p}^{(1)} + \theta_{1l,p}^{(2)} + \ldots + \theta_{1l,p}^{(K)}$$

where K is a number of transmitters that transmitted the plurality of interleaved chirp sequences.

In some implementations, the at least one non-transitory computer-readable medium further stores machine instructions, which when executed by the at least one processor, cause the at least one processor to obtain the received radar signal and perform a first FFT on the received radar signal to obtain the range-sample-antenna data cube. For each particular range bin in the range-sample-antenna data cube, the at least one processor determines whether a characteristic of the range bin satisfies a criterion. In response to the characteristic of the range bin satisfying the criterion, the at least one processor performs a second FFT on a sample-antenna array corresponding to the particular range bin. In response to the characteristic of the range bin not satisfying the criterion, the at least one processor includes the sample-antenna array corresponding to the particular range bin in the subset of range bins.

A non-transitory computer-readable medium stores machine instructions that cause at least one processor to obtain a range-sample-antenna data cube for a received radar signal comprising reflections of a plurality of interleaved chirp sequences off of objects in an environment. The machine instructions cause the at least one processor to generate, for each chirp sequence of the plurality of interleaved chirp sequences, a Hankel matrix based on a subset of range bins of the range-sample-antenna data cube corresponding to the particular chirp sequence, and a block Hankel matrix based on the Hankel matrices corresponding to the plurality of interleaved chirp sequences. The machine instructions cause the at least one processor to perform truncated singular value decomposition on the block Hankel matrix to estimate subspaces and object detection to identify selection matrices in the estimated subspaces.

The machine instructions cause the at least one processor to then calculate least-squares approximations for the selection matrices and the block Hankel matrix to obtain, for each chirp sequence in the plurality of interleaved chirp sequences, a first phase shift matrix $\theta_{11}$ and a second set of phase shift matrices $\theta_{1l}$, l=2, ..., L. The first phase shift matrix $\theta_{11}$ represents a phase shift over a repetition interval between chirps in a same chirp sequence, and the second phase shift matrices $\theta_{1l}$, l=2, ..., L represent a phase shift between chirps of a same sequence index in the plurality of interleaved chirp sequences. The machine instructions cause the at least one processor to perform joint diagonalization of the first matrix $\theta_{1,1}$ and the second set of matrices $\theta_{1l}$, l=2, ..., L and Doppler division multiplexing compensation on the first matrix $\theta_{11}$ and the second set of matrices $\theta_{1l}$, l=2, ..., L. The machine instructions cause the at least one processor to then resolve ambiguities in determined velocities based on a comparison of the first matrix $\theta_{11}$ and the second set of matrices $\theta_{1l}$, l=2, ..., L.

In some implementations, a Hankel matrix corresponding to an lth chirp sequence is represented as:

$$H_l = M'\theta_{1l}X + N_l \qquad (1)$$

where M' is an B×(PK) sub-matrix of a Vandermonde matrix M, B is a number greater than a maximum expected number P of objects in a range bin, K is the number of transmitters, $\theta_{1l}$ is a diagonal matrix that represents phase shifts introduced by velocities of the objects in the environment between the first chirp sequence and the lth chirp sequence, X is a matrix representing shifted combination of complex amplitudes of the received radar signal reflected off of objects in the environment with object velocity induced phase changes, and $N_l$ is a noise matrix for the lth chirp sequence.

In some implementations, a number of possible selection matrix pairs is represented as two time a number G, where G is represented as:

$$G = \frac{L!}{2!(L-2)!}$$

where "!" indicates the factorial of a number. In some implementations, the plurality of interleaved chirp sequences includes a number L of interleaved chirp sequences. The least-squares approximation for an lth chirp sequence is represented as:

$$\Psi_{11} = U_{\Phi 1}^\dagger U_{\Phi 2} = T\theta_{11}T^{-1}$$
$$\Psi_{1l} = U_{\theta 1}^\dagger U_{\theta l} = T\theta_{1l}T^{-1}, l = 2, \ldots, L$$

where $\Psi_{11}$ represents a least-squares model for the first matrix $\theta_{11}$, $\Psi_{1l}$ represents a least-squares model for the second set of matrices $\theta_{1l}$, l=2, ..., L, and T is a non-singular matrix that jointly diagonalizes $\Psi_{11}$ and $\Psi_{1l}$. The matrix T has dimensions (PK)×(PK), where P is an expected maximum number of objects in a range bin and K is a number of transmitters that transmitted the plurality of interleaved chirp sequences.

In some implementations, the Doppler division multiplexing compensation for the first matrix $\theta_{11}$ causes a phase shift $\arg(\theta_{11,p})$ for a particular object p in a number P of objects in the environment over the repetition interval between chirps in the same chirp sequence to be represented as:

$$\theta_{11,p} = \theta_{11,p}^{(1)} + \theta_{11,p}^{(2)} e^{-j\frac{2\pi}{K}} + \ldots + \theta_{11,p}^{(K)} e^{-j\frac{2\pi(K-1)}{K}}$$

where K is a number of transmitters that transmitted the plurality of interleaved chirp sequences. In some implementations, the Doppler division multiplexing for the second phase shift matrices $\theta_{1l}$, l=2, ..., L causes a second set of phase shifts $\arg(\theta_{1l,p})$ for a particular object p in a number P of objects in the environment phase shift between chirps of the same index in the plurality of interleaved chirp sequences to be represented as:

$$\theta_{1l,p} = \theta_{1l,p}^{(1)} + \theta_{1l,p}^{(2)} + \ldots + \theta_{1l,p}^{(K)}$$

where K is a number of transmitters that transmitted the plurality of interleaved chirp sequences.

In some implementations, the at least one non-transitory computer-readable medium further stores machine instructions, which when executed by the at least one processor, cause the at least one processor to obtain the received radar signal and perform a first FFT on the received radar signal to obtain the range-sample-antenna data cube. For each particular range bin in the range-sample-antenna data cube, the machine instructions cause the at least one processor to determine whether a characteristic of the range bin satisfies a criterion. In response to the characteristic of the range bin satisfying the criterion, the machine instructions cause the at least one processor to perform a second FFT on a sample-antenna array corresponding to the particular range bin. In response to the characteristic of the range bin not satisfying the criterion, the machine instructions cause the at least one processor to include the sample-antenna array corresponding to the particular range bin in the subset of range bins.

A method includes obtaining a range-sample-antenna data cube for a received radar signal comprising reflections of a plurality of interleaved chirp sequences off of objects in an environment. For each chirp sequence of the plurality of interleaved chirp sequences, a Hankel matrix is generated based on a subset of range bins of the range-sample-antenna data cube corresponding to the particular chirp sequence, and a block Hankel matrix is generated based on the Hankel matrices corresponding to the plurality of interleaved chirp sequences. Truncated singular value decomposition is performed on the block Hankel matrix to estimate subspaces, and object detection is performed to identify selection matrices in the estimated subspaces.

Least-squares approximations are calculated for the selection matrices and the block Hankel matrix to obtain, for each chirp sequence in the plurality of interleaved chirp sequences, a first phase shift matrix $\theta_{11}$ and a second set of phase shift matrices $\theta_{1l}$, l=2, . . . , L. The first phase shift matrix $\theta_{11}$ represents a phase shift over a repetition interval between chirps in a same chirp sequence, and the second phase shift matrices $\theta_{1l}$, l=2, . . . , L represent a phase shift between chirps of a same sequence index in the plurality of interleaved chirp sequences. Joint diagonalization of the first matrix $\theta_{1,1}$ and the second set of matrices $\theta_{1l}$, l=2, . . . , L is performed, and Doppler division multiplexing compensation is performed on the first matrix $\theta_{11}$ and the second set of matrices $\theta_{1l}$, l=2, . . . , L. Ambiguities in determined velocities are resolved based on a comparison of the first matrix $\theta_{11}$ and the second set of matrices $\theta_{1l}$, l=2, . . . , L.

In some implementations, a Hankel matrix corresponding to an lth chirp sequence is represented as:

$$H_l = M'\theta_{1l}X + N_l \quad (1)$$

where M' is an B×(PK) sub-matrix of a Vandermonde matrix M, B is a number greater than a maximum expected number P of objects in a range bin, K is the number of transmitters, $\theta_{1l}$ is a diagonal matrix that represents phase shifts introduced by velocities of the objects in the environment between the first chirp sequence and the lth chirp sequence, X is a matrix representing shifted combination of complex amplitudes of the received radar signal reflected off of objects in the environment with object velocity induced phase changes, and $N_l$ is a noise matrix for the lth chirp sequence.

In some implementations, a number of possible selection matrix pairs is represented as two time a number G, where G is represented as:

$$G = \frac{L!}{2!(L-2)!}$$

where "!" indicates the factorial of a number. In some implementations, the plurality of interleaved chirp sequences includes a number L of interleaved chirp sequences. The least-squares approximation for an lth chirp sequence is represented as:

$$\Psi_{11} = U_{\Phi 1}^\dagger U_{\Phi 2} = T\theta_{11}T^{-1}$$

$$\Psi_{1l} = U_{\theta 1}^\dagger U_{\theta l} = T\theta_{1l}T^{-1}, l = 2, \dots, L$$

where $\Psi_{11}$ represents a least-squares model for the first matrix $\theta_{11}$, $\Psi_{1l}$ represents a least-squares model for the second set of matrices $\theta_{1l}$, l=2, . . . , L, and T is a non-singular matrix that jointly diagonalizes $\Psi_{11}$ and $\Psi_{1l}$. The matrix T has dimensions (PK)×(PK), where P is an expected maximum number of objects in a range bin and K is a number of transmitters that transmitted the plurality of interleaved chirp sequences.

In some implementations, the Doppler division multiplexing compensation for the first matrix $\theta_{11}$ causes a phase shift $\arg(\theta_{11,p})$ for a particular object p in a number P of objects in the environment over the repetition interval between chirps in the same chirp sequence to be represented as:

$$\theta_{11,p} = \theta_{11,p}^{(1)} + \theta_{11,p}^{(2)} e^{-j\frac{2\pi}{K}} + \dots + \theta_{11,p}^{(K)} e^{-j\frac{2\pi(K-1)}{K}}$$

where K is a number of transmitters that transmitted the plurality of interleaved chirp sequences. In some implementations, the Doppler division multiplexing for the second phase shift matrices $\theta_{1l}$, l=2, . . . , L causes a second set of phase shifts $\arg(\theta_{1l,p})$ for a particular object p in a number P of objects in the environment phase shift between chirps of the same index in the plurality of interleaved chirp sequences to be represented as:

$$\theta_{1l,p} = \theta_{1l,p}^{(1)} + \theta_{1l,p}^{(2)} + \dots + \theta_{1l,p}^{(K)}$$

where K is a number of transmitters that transmitted the plurality of interleaved chirp sequences.

In some implementations, the method also includes obtaining the received radar signal and performing a first FFT on the received radar signal to obtain the range-sample-antenna data cube. For each particular range bin in the range-sample-antenna data cube, it is determined whether a characteristic of the range bin satisfies a criterion. In response to the characteristic of the range bin satisfying the criterion, a second FFT is performed on a sample-antenna array corresponding to the particular range bin. In response to the characteristic of the range bin not satisfying the criterion, the sample-antenna array corresponding to the particular range bin is included in the subset of range bins.

What is claimed is:

1. A system, comprising:
   at least one processor; and
   at least one non-transitory computer-readable medium storing machine instructions which, when executed by the at least one processor, cause the at least one processor to:

obtain a range-sample-antenna data cube for a received radar signal comprising reflections of a plurality of interleaved chirp sequences off of objects in an environment;

generate, for each chirp sequence of the plurality of interleaved chirp sequences, a Hankel matrix based on a subset of range bins of the range-sample-antenna data cube corresponding to the particular chirp sequence;

generate a block Hankel matrix based on the Hankel matrices corresponding to the plurality of interleaved chirp sequences;

perform truncated singular value decomposition on the block Hankel matrix to estimate subspaces;

perform object detection to identify selection matrices in the estimated subspaces;

calculate least-squares approximations for the selection matrices and the block Hankel matrix to obtain, for each chirp sequence in the plurality of interleaved chirp sequences, a first phase shift matrix $\theta_{11}$ and a second set of phase shift matrices $\theta_{1l}$, l=2, . . . , L, wherein the first matrix $\theta_{11}$ represents a phase shift over a repetition interval between chirps in a same chirp sequence, and wherein the second set of matrices $\theta_{1l}$, l=2, . . . , L represent a phase shift between chirps of a same sequence index in the plurality of interleaved chirp sequences;

perform joint diagonalization of the first matrix $\theta_{11}$ and the second set of matrices $\theta_{1l}$, l=2, . . . , L;

perform Doppler division multiplexing compensation on the first matrix $\theta_{11}$ and the second set of matrices $\theta_{1l}$, l=2, . . . , L; and resolve ambiguities in determined velocities based on a comparison of the first matrix $\theta_{11}$ and the second set of matrices $\theta_{1l}$, l=2, . . . , L.

2. The system of claim 1, wherein a Hankel matrix corresponding to an lth chirp sequence is represented as:

$$H_l = M'\theta_{1l}X + N_l$$

where M' is an B×(PK) sub-matrix of a Vandermonde matrix M, B is a number greater than a maximum expected number P of objects in a range bin, K is the number of transmitters, $\theta_{1l}$ is a diagonal matrix that represents phase shifts introduced by velocities of the objects in the environment between the first chirp sequence and the lth chirp sequence, X is a matrix representing shifted combination of complex amplitudes of the received radar signal reflected off of objects in the environment with object velocity induced phase changes, and $N_l$ is a noise matrix for the lth chirp sequence.

3. The system of claim 1, wherein a number of possible selection matrix pairs is represented as two times a number G, where G is represented as:

$$G = \frac{L!}{2!(L-2)!}$$

where "!" indicates the factorial of a number.

4. The system of claim 1, wherein the plurality of interleaved chirp sequences includes a number L of interleaved chirp sequences, wherein the least-squares approximation for an lth chirp sequence is represented as:

$$\Psi_{11} = U_{\Phi 1}^\dagger U_{\Phi 2} = T\theta_{11}T^{-1}$$

$$\Psi_{1l} = U_{\phi 1}^\dagger U_{\theta l} = T\theta_{1l}T^{-1}, l = 2, \ldots, L$$

where $\Psi_{11}$ represents a least-squares model for the first matrix $\theta_{11}$, $\Psi_{1l}$ represents a least-squares model for the second set of matrices $\theta_{1l}$, l=2, . . . , L, and T is a non-singular matrix that jointly diagonalizes $\Psi_{11}$ and $\Psi_{1l}$, wherein the matrix T has dimensions (PK)×(PK) where P is an expected maximum number of objects in a range bin and K is a number of transmitters that transmitted the plurality of interleaved chirp sequences.

5. The system of claim 1, wherein the Doppler division multiplexing compensation for the first matrix $\theta_{11}$ causes a phase shift arg($\theta_{11,p}$) for a particular object p in a number P of objects in the environment over the repetition interval between chirps in the same chirp sequence to be represented as:

$$\theta_{11,p} = \theta_{11,p}^{(1)} + \theta_{11,p}^{(2)}e^{-j\frac{2\pi}{K}} + \ldots + \theta_{11,p}^{(K)}e^{-j\frac{2\pi(K-1)}{K}}$$

where K is a number of transmitters that transmitted the plurality of interleaved chirp sequences.

6. The system of claim 1, wherein the Doppler division multiplexing compensation for the $\theta_{1l}$, l=2, . . . , L causes a second set of phase shifts arg($\theta_{1l,p}$) for a particular object p in a number P of objects in the environment phase shift between chirps of the same index in the plurality of interleaved chirp sequences to be represented as:

$$\theta_{1l,p} = \theta_{1l,p}^{(1)} + \theta_{1l,p}^{(2)} + \ldots + \theta_{1l,p}^{(K)}$$

where K is a number of transmitters that transmitted the plurality of interleaved chirp sequences.

7. The system of claim 1, wherein the at least one non-transitory computer-readable medium further stores machine instructions which, when executed by the at least one processor, cause the at least one processor to:

obtain the received radar signal;

perform a first fast Fourier transform (FFT) on the received radar signal to obtain the range-sample-antenna data cube;

for each particular range bin in the range-sample-antenna data cube:

determine whether a characteristic of the range bin satisfies a criterion;

in response to the characteristic of the range bin satisfying the criterion, perform a second FFT on a sample-antenna array corresponding to the particular range bin; and in response to the characteristic of the range bin not satisfying the criterion, include the sample-antenna array corresponding to the particular range bin in the subset of range bins.

8. A non-transitory computer-readable medium storing machine instructions which, when executed by at least one processor, cause the at least one processor to:

obtain a range-sample-antenna data cube for a received radar signal comprising reflections of a plurality of interleaved chirp sequences off of objects in an environment;

generate, for each chirp sequence of the plurality of interleaved chirp sequences, a Hankel matrix based on a subset of range bins of the range-sample-antenna data cube corresponding to the particular chirp sequence;

generate a block Hankel matrix based on the Hankel matrices corresponding to the plurality of interleaved chirp sequences;

perform truncated singular value decomposition on the block Hankel matrix to estimate subspaces;

perform object detection to identify selection matrices in the estimated subspaces;

calculate least-squares approximations for the selection matrices and the block Hankel matrix to obtain, for each chirp sequence in the plurality of interleaved chirp sequences, a first phase shift matrix $\theta_{11}$ and a second set of phase shift matrices $\theta_{1l}$, l=2, ..., L, wherein the first phase shift matrix $\theta_{11}$ represents a phase shift over a repetition interval between chirps in a same chirp sequence, and wherein the second set of matrices $\theta_{1l}$, l=2, ..., L represent a phase shift between chirps of a same sequence index in the plurality of interleaved chirp sequences;

perform joint diagonalization of the first matrix $\theta_{11}$ and the second set of matrices $\theta_{1l}$, l=2, ..., L;

perform Doppler division multiplexing compensation on phase shifts in the first matrix $\theta_{11}$ and the phase shifts collected in second set of matrices $\theta_{1l}$, l=2, ..., L; and resolve ambiguities in determined velocities based on a comparison of the phase shifts from the first matrix $\theta_{11}$ and the phase shifts from the second set of matrices $\theta_{1l}$, l=2, ..., L.

9. The non-transitory computer-readable medium of claim 8, wherein a Hankel matrix corresponding to an lth chirp sequence is represented as:

$$H_l = M'\theta_{1l}X + N_l$$

where M' is an B×(PK) sub-matrix of a Vandermonde matrix M, B is a number greater than a maximum expected number P of objects in a range bin, K is the number of transmitters, $\theta_{1l}$ is a diagonal matrix that represents phase shifts introduced by velocities of the objects in the environment between the first chirp sequence and the lth chirp sequence, X is a matrix representing shifted combination of complex amplitudes of the received radar signal reflected off of objects in the environment with object velocity induced phase changes, and $N_l$ is a noise matrix for the lth chirp sequence.

10. The non-transitory computer-readable medium of claim 8, wherein a number of possible selection matrix pairs is represented as two times a number G, where G is represented as:

$$G = \frac{L!}{2!(L-2)!}$$

where "!" indicates the factorial of a number.

11. The non-transitory computer-readable medium of claim 8, wherein the plurality of interleaved chirp sequences includes a number L of interleaved chirp sequences, wherein the least-squares approximation for an lth chirp sequence is represented as:

$$\Psi_{11} = U_{\Phi1}^\dagger U_{\Phi2} = T\theta_{11}T^{-1}$$

$$\Psi_{1l} = U_{\theta1}^\dagger U_{\theta l} = T\theta_{1l}T^{-1}, l = 2, \ldots, L$$

where $\Psi_{11}$ represents a least-squares model for the first phase shift matrix $\theta_{11}$, $\Psi_{1l}$ represent a least-squares models for the second set of matrices $\theta_{1l}$, l=2, ..., L, and T is a non-singular matrix that jointly diagonalizes $\Psi_{11}$ and $\Psi_{1l}$, wherein the matrix T has dimensions (PK)×(PK) where P is an expected maximum number of objects in a range bin and K is a number of transmitters that transmitted the plurality of interleaved chirp sequences.

12. The non-transitory computer-readable medium of claim 8, wherein the Doppler division multiplexing compensation for the first matrix $\theta_{11}$ causes a phase shift $\arg(\theta_{11,p})$ for a particular object p in a number P of objects in the environment over the repetition interval between chirps in the same chirp sequence to be represented as:

$$\theta_{11,p} = \theta_{11,p}^{(1)} + \theta_{11,p}^{(2)}e^{-j\frac{2\pi}{K}} + \ldots + \theta_{11,p}^{(K)}e^{-j\frac{2\pi(K-1)}{K}}$$

where K is a number of transmitters that transmitted the plurality of interleaved chirp sequences.

13. The non-transitory computer-readable medium of claim 8, wherein the Doppler division multiplexing compensation for the second set of matrices $\theta_{1l}$, l=2, ..., L causes a second phase shift $\arg(\theta_{1l,p})$ for a particular object p in a number P of objects in the environment phase shift between chirps of the same index in the plurality of interleaved chirp sequences to be represented as:

$$\theta_{1l,p} = \theta_{1l,p} = \theta_{1l,p}^{(1)} + \theta_{1l,p}^{(2)} + \ldots + \theta_{1l,p}^{(K)}$$

where K is a number of transmitters that transmitted the plurality of interleaved chirp sequences.

14. The non-transitory computer-readable medium of claim 8, further storing machine instructions which, when executed by the at least one processor, cause the at least one processor to:

obtain the received radar signal;

perform a first fast Fourier transform (FFT) on the received radar signal to obtain the range-sample-antenna data cube;

for each particular range bin in the range-sample-antenna data cube:

determine whether a characteristic of the range bin satisfies a criterion;

in response to the characteristic of the range bin satisfying the criterion, perform a second FFT on a sample-antenna array corresponding to the particular range bin; and in response to the characteristic of the range bin not satisfying the criterion, include the sample-antenna array corresponding to the particular range bin in the subset of range bins.

15. A method, comprising:
obtaining a range-sample-antenna data cube for a received radar signal comprising reflections of a plurality of interleaved chirp sequences off of objects in an environment;
generating, for each chirp sequence of the plurality of interleaved chirp sequences, a Hankel matrix based on a subset of range bins of the range-sample-antenna data cube corresponding to the particular chirp sequence;
generating a block Hankel matrix based on the Hankel matrices corresponding to the plurality of interleaved chirp sequences;
performing truncated singular value decomposition on the block Hankel matrix to estimate subspaces;
performing object detection to identify selection matrices in the estimated subspaces;
calculating least-squares approximations for the selection matrices and the block Hankel matrix to obtain, for each chirp sequence in the plurality of interleaved chirp sequences, a first phase shift matrix $\theta_{11}$ and a second set of phase shift matrices $\theta_{1l}$, l=2, ..., L, wherein the first phase shift matrix $\theta_{11}$ represents a phase shift over a repetition interval between chirps in a same chirp sequence, and wherein the second set of matrices $\theta_{1l}$, l=2, ..., L represent a phase shift between chirps of a same sequence index in the plurality of interleaved chirp sequences;
performing joint diagonalization of the first matrix $\theta_{11}$ and the second set of matrices $\theta_{1l}$, l=2, ..., L;
performing Doppler division multiplexing compensation on the first matrix $\theta_{11}$ and the second set of matrices $\theta_{1l}$, l=2, ..., L; and
resolving ambiguities in determined velocities based on a comparison of the first matrix $\theta_{11}$ and the second set of matrices $\theta_{1l}$, l=2, ..., L.

16. The method of claim 15, wherein a Hankel matrix corresponding to an lth chirp sequence is represented as:

$$H_l = M'\theta_{1l}X + N_l$$

where M' is an B×(PK) sub-matrix of a Vandermonde matrix M, B is a number greater than a maximum expected number P of objects in a range bin, K is the number of transmitters, $\theta_{1l}$ is a diagonal matrix that represents phase shifts introduced by velocities of the objects in the environment between the first chirp sequence and the lth chirp sequence, X is a matrix representing shifted combination of complex amplitudes of the received radar signal reflected off of objects in the environment with object velocity induced phase changes, and $N_l$ is a noise matrix for the lth chirp sequence.

17. The method of claim 15, wherein a number of possible selection matrix pairs is represented as two times a number G, where G is represented as:

$$G = \frac{L!}{2!(L-2)!}$$

where "!" indicates the factorial of a number.

18. The method of claim 15, wherein the plurality of interleaved chirp sequences includes a number L of interleaved chirp sequences, wherein the least-squares approximation for an lth chirp sequence is represented as:

$$\Psi_{11} = U_{\Phi 1}^\dagger U_{\Phi 2} = T\theta_{11}T^{-1}$$
$$\Psi_{1l} = U_{\theta 1}^\dagger U_{\theta l} = T\theta_{1l}T^{-1}, l = 2, \ldots, L$$

where $\Psi_{11}$ represents a least-squares model for the first matrix $\theta_{11}$, $\Psi_{1l}$ represents a least-squares model for the second set of matrices $\theta_{1l}$, l=2, ..., L, and T is a non-singular matrix that jointly diagonalizes $\Psi_{11}$ and $\Psi_{1l}$, wherein the matrix T has dimensions (PK)×(PK) where P is an expected maximum number of objects in a range bin and K is a number of transmitters that transmitted the plurality of interleaved chirp sequences.

19. The method of claim 15, wherein the Doppler division multiplexing compensation for the first matrix $\theta_{11}$ causes a phase shift $\arg(\theta_{11,p})$ for a particular object p in a number P of objects in the environment over the repetition interval between chirps in the same chirp sequence to be represented as:

$$\theta_{11,p} = \theta_{11,p}^{(1)} + \theta_{11,p}^{(2)} e^{-j\frac{2\pi}{K}} + \ldots + \theta_{11,p}^{(K)} e^{-j\frac{2\pi(K-1)}{K}}$$

where K is a number of transmitters that transmitted the plurality of interleaved chirp sequences.

20. The method of claim 15, wherein the Doppler division multiplexing compensation for the second set of matrices $\theta_{1l}$, l=2, ..., L causes a second phase shift $\arg(\theta_p)$ for a particular object p in a number P of objects in the environment phase shift between chirps of the same index in the plurality of interleaved chirp sequences to be represented as:

$$\theta_{1l,p} = \theta_{1l,p}^{(1)} + \theta_{1l,p}^{(2)} + \ldots + \theta_{1l,p}^{(K)},$$

where K is a number of transmitters that transmitted the plurality of interleaved chirp sequences.

21. The method of claim 15, further comprising:
obtaining the received radar signal;
performing a first fast Fourier transform (FFT) on the received radar signal to obtain the range-sample-antenna data cube;
for each particular range bin in the range-sample-antenna data cube:
determining whether a characteristic of the range bin satisfies a criterion;
in response to the characteristic of the range bin satisfying the criterion, performing a second FFT on a sample-antenna array corresponding to the particular range bin; and
in response to the characteristic of the range bin not satisfying the criterion, including the sample-antenna array corresponding to the particular range bin in the subset of range bins.

* * * * *